United States Patent
Kobayashi et al.

(10) Patent No.: US 12,000,232 B2
(45) Date of Patent: Jun. 4, 2024

(54) PLUG, RETAINING MEMBER, AND METHOD FOR WELL COMPLETION USING PLUG

(71) Applicant: Kureha Corporation, Tokyo (JP)

(72) Inventors: Seishiro Kobayashi, Tokyo (JP); Teruaki Yoshii, Tokyo (JP)

(73) Assignee: KUREHA CORPORATION, Tokyo (JP)

(*) Notice: Subject to any disclaimer, the term of this patent is extended or adjusted under 35 U.S.C. 154(b) by 235 days.

(21) Appl. No.: 17/347,295

(22) Filed: Jun. 14, 2021

(65) Prior Publication Data

US 2021/0317720 A1    Oct. 14, 2021

Related U.S. Application Data

(63) Continuation of application No. 16/617,282, filed as application No. PCT/JP2018/027526 on Jul. 23, 2018, now Pat. No. 11,066,895.

(30) Foreign Application Priority Data

Aug. 10, 2017  (JP) .................................. 2017-156159

(51) Int. Cl.
  *E21B 33/12*   (2006.01)
  *E21B 33/128*  (2006.01)
  (Continued)

(52) U.S. Cl.
  CPC ............ *E21B 33/12* (2013.01); *E21B 33/128* (2013.01); *E21B 33/1216* (2013.01);
  (Continued)

(58) Field of Classification Search
  CPC .... E21B 33/12; E21B 33/128; E21B 33/1216; E21B 33/129; E21B 33/1293; E21B 2200/08; F16J 15/06; F16J 15/10
  See application file for complete search history.

(56) References Cited

U.S. PATENT DOCUMENTS

| | | | | |
|---|---|---|---|---|
| 4,765,404 A | * | 8/1988 | Bailey | E21B 33/1295 166/134 |
| 6,695,050 B2 | * | 2/2004 | Winslow | E21B 33/1216 166/118 |

(Continued)

FOREIGN PATENT DOCUMENTS

| | | |
|---|---|---|
| CN | 88 1 02073 A | 10/1988 |
| CN | 102747982 A | 10/2012 |

(Continued)

OTHER PUBLICATIONS

English translation of First Office Action of the Chinese Intellectual Property Administration (CNIPA) for CN201880031337.5/PCT/JP2018/027526 dated Mar. 26, 2020.

(Continued)

*Primary Examiner* — Steven A MacDonald
(74) *Attorney, Agent, or Firm* — Birch, Stewart, Kolasch & Birch, LLP

(57) ABSTRACT

A downhole plug (10) includes a mandrel (1) having a hollow structure, an annular sealing member (2) attached to an outer circumferential surface of the mandrel (1) and being deformable by exerted pressure, and an annular socket (3) attached, adjacent to the annular sealing member (2), onto the outer circumferential surface of the mandrel (1), downstream of where a pressure is exerted on the sealing member (2). The annular socket (3) is configured to include a socket-inner portion (31) which comes into contact with the outer circumferential surface of the mandrel (1), and a socket-outer portion (32) in an annular shape having an inner diameter equivalent to or larger than that of the socket-inner portion (31) and movably attached to the socket-inner portion (31). The socket-outer portion (32) includes a face facing the sealing member (2).

10 Claims, 3 Drawing Sheets

(51) Int. Cl.
*E21B 33/129* (2006.01)
*F16J 15/06* (2006.01)
*F16J 15/10* (2006.01)

(52) U.S. Cl.
CPC ......... *E21B 33/129* (2013.01); *E21B 33/1293* (2013.01); *E21B 2200/08* (2020.05); *F16J 15/06* (2013.01); *F16J 15/10* (2013.01)

(56) References Cited

U.S. PATENT DOCUMENTS

| | | | | |
|---|---|---|---|---|
| 8,205,671 | B1 | 6/2012 | Branton | |
| 8,544,541 | B2* | 10/2013 | Bishop | E21B 33/1204 166/134 |
| 10,087,704 | B2 | 10/2018 | Conner et al. | |
| 10,260,298 | B2 | 4/2019 | Stair et al. | |
| 11,072,992 | B1* | 7/2021 | Milne | E21B 33/128 |
| 2002/0043368 | A1* | 4/2002 | Bell | E21B 33/1216 166/134 |
| 2004/0036225 | A1* | 2/2004 | Ritter | E21B 33/1208 277/328 |
| 2006/0289173 | A1* | 12/2006 | Conaway | E21B 33/1216 166/387 |
| 2009/0308592 | A1* | 12/2009 | Mercer | E21B 23/06 166/134 |
| 2010/0276137 | A1* | 11/2010 | Nutley | E21B 33/1208 166/185 |
| 2011/0277989 | A1 | 11/2011 | Frazier | |
| 2012/0292014 | A1* | 11/2012 | Bishop | E21B 33/134 166/135 |
| 2013/0008673 | A1* | 1/2013 | Smith | E21B 33/1292 166/134 |
| 2013/0192853 | A1* | 8/2013 | Themig | E21B 33/128 166/134 |
| 2013/0269929 | A1* | 10/2013 | Smith | E21B 33/1216 166/118 |
| 2014/0190685 | A1 | 7/2014 | Frazier et al. | |
| 2016/0084036 | A1 | 3/2016 | Themig | |
| 2016/0090813 | A1 | 3/2016 | Conner et al. | |
| 2016/0298415 | A1 | 10/2016 | Takahashi et al. | |
| 2017/0158942 | A1 | 6/2017 | Okura et al. | |
| 2017/0268310 | A1* | 9/2017 | Shkurti | E21B 33/1208 |
| 2017/0356548 | A1* | 12/2017 | Kathol | F16J 15/008 |
| 2018/0016859 | A1 | 1/2018 | Stair et al. | |
| 2018/0216431 | A1* | 8/2018 | Walton, III | E21B 23/06 |

FOREIGN PATENT DOCUMENTS

| | | |
|---|---|---|
| JP | S36-5702 B | 5/1961 |
| JP | S64-1892 A | 1/1989 |
| JP | 2015-143459 A | 8/2015 |
| WO | WO 2015/098913 A1 | 7/2015 |
| WO | WO 2016/048531 A1 | 3/2016 |
| WO | WO 2016/148722 A1 | 9/2016 |

OTHER PUBLICATIONS

English translation of First Search Report of the Chinese Intellectual Property Administration (CNIPA) for CN201880031337.5/PCT/ JP2018/027526 dated Mar. 17, 2020.
First Office Action of the Chinese Intellectual Property Administration (CNIPA) for CN201880031337.5/PCT/ JP2018/027526 dated Mar. 26, 2020.
First Search Report of the Chinese Intellectual Property Administration (CNIPA) for CN201880031337.5/PCT/ JP2018/027526 dated Mar. 17, 2020.
International Search Report of the International Searching Authority for PCT/JP2018/027526 with mailing date of Oct. 9, 2018.
Office Action of the Intellectual Property Office of Canada for CA3,063,838 dated Nov. 2, 2020.
Office Action of the Intellectual Property Office of Canada for CA3,063,838 with search date of Jul. 9, 2020.
Office Action of the Intellectual Property Office of Canada for CA3,063,838/PCT/ JP2018/027526 with search date of Feb. 18, 2020.
Second Office Action of the Chinese Intellectual Property Administration (CNIPA) for CN201880031337.5/PCT/ JP2018/027526 dated Aug. 24, 2020, including its English language translation.
Translation of the International Preliminary Report on Patentability Chapter I for PCT/JP2018/027526 with mailing date of Feb. 20, 2020; translation of the Written Opinion of the International Searching Authority for PCT/ JP2018/027526 with mailing date of Oct. 9, 2018.
Translation of the International Search Report of the International Searching Authority for PCT/JP2018/027526 with mailing date of Oct. 9, 2018.
U.S. Office Action dated Nov. 17, 2020 for U.S. Appl. No. 16/617,282.

\* cited by examiner

FIG. 3A
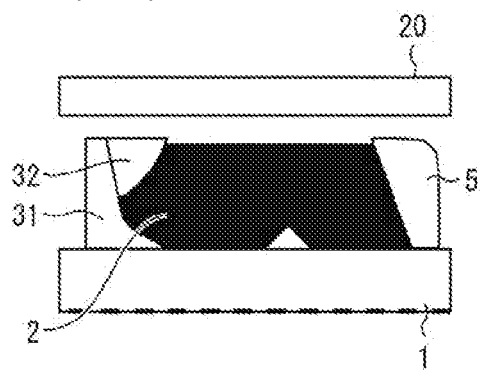
FIG. 3B
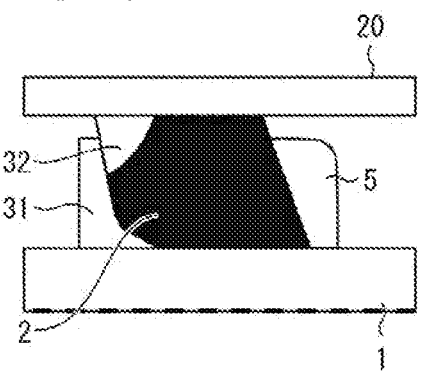
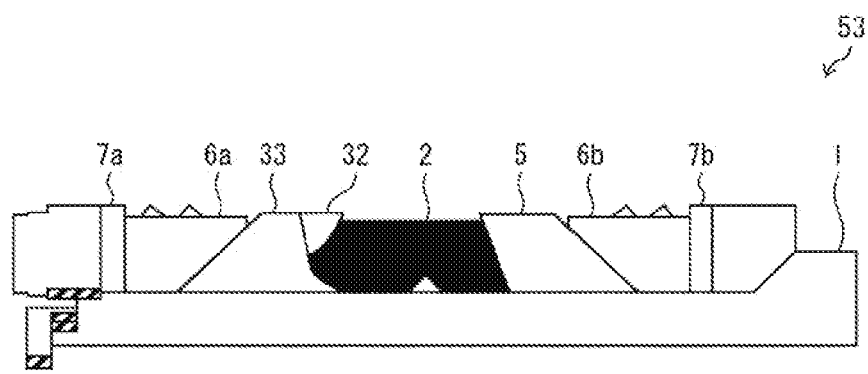
FIG. 4
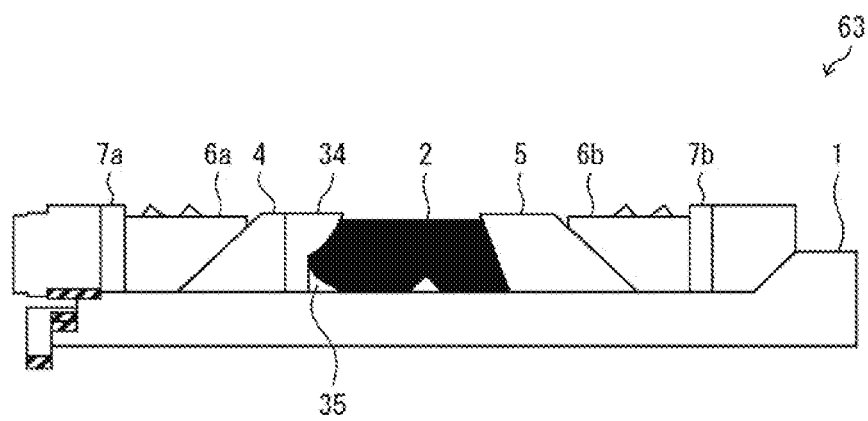
FIG. 5

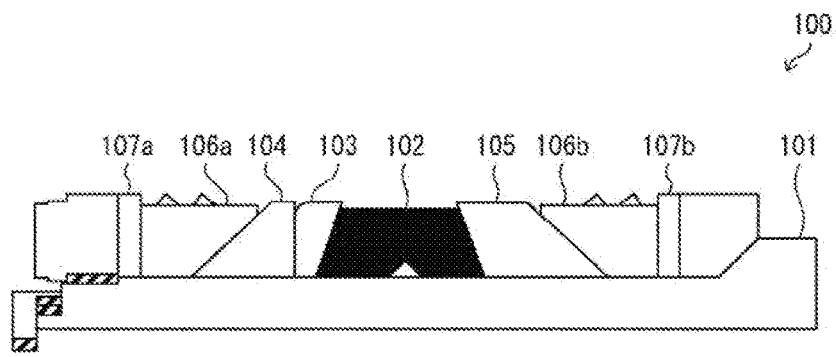
FIG. 6
--Prior Art--
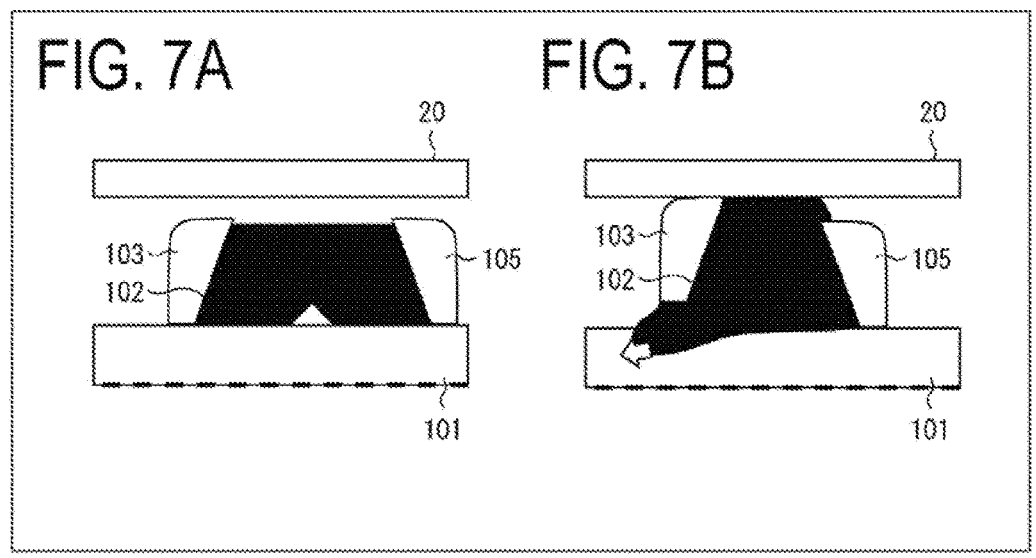
--Prior Art--
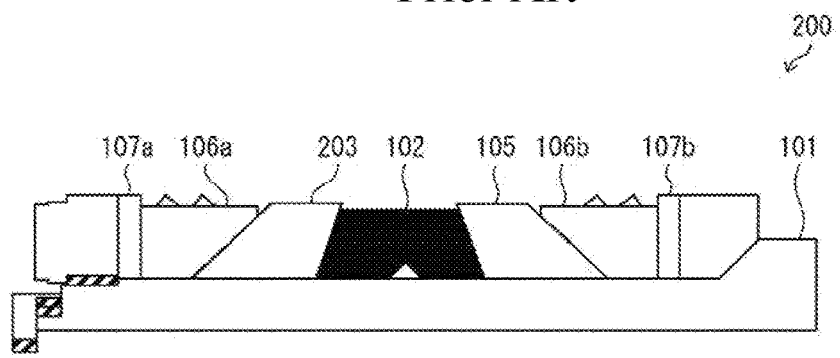
FIG. 8
--Prior Art--

PLUG, RETAINING MEMBER, AND METHOD FOR WELL COMPLETION USING PLUG

CROSS REFERENCE TO RELATED APPLICATIONS

This application is a Continuation of copending application Ser. No. 16/617,282, filed on Nov. 26, 2019, which is the National Phase under 35 U.S.C. § 371 of International Application No. PCT/JP2018/027526 filed on Jul. 23, 2018, and claims priority under 35 U.S.C. § 119(a) to Patent Application No. 2017-156159, filed in Japan on Aug. 10, 2017, all of which are hereby expressly incorporated by reference into the present application.

TECHNICAL FIELD

The present invention relates to a plug and a retaining member used for well completion, and a method for well completion using the plug.

BACKGROUND ART

Various tools have been developed which are referred to as downhole tools for plugging and fixing a wellbore for excavating shale oil by hydraulic fracturing or the like. As one of these downhole tools, downhole plugs are known. One of the functions of the downhole plug is that a prescribed member constituting the downhole plug abuts against an inner wall of a wellbore to fix the downhole plug to the wellbore, and the wellbore is blocked by an elastic member or the like constituting the downhole plug (for example, Patent Document 1).

CITATION LIST

Patent Document

Patent Document 1: US 2011/0,277,989 A (published on Nov. 17, 2011)

SUMMARY OF INVENTION

Technical Problem

Incidentally, in case of a downhole tool with which a wellbore is plugged by an elastic member, supposing that deformation of the elastic member is not controlled, a desired advantage cannot be obtained due to an unanticipated deformation of the elastic member, where, in the worst case, an issue arises in that a breakage is caused to other components constituting the downhole plug. The above issue will be described below in detail with reference to FIGS. 6 to 7B.

FIGS. 6 to 7B are explanatory reference views illustrating an issue in downhole plugs in the related art. FIG. 6 is a view schematically illustrating a portion of an axial cross-section of the downhole plug in the related art. FIGS. 7A and 7B are views illustrating a portion of the downhole plug illustrated in FIG. 6. Note that, for convenience of explanation, in FIGS. 6 to 7B, an axial direction of the downhole plug is illustrated as the horizontal direction of the plane of the paper. In an actual use, however, the downhole plug is occasionally disposed such that the axial direction of the downhole plug extends along the depth direction of a wellbore. In addition, in FIGS. 7A and 7B, shapes of some members illustrated in FIG. 6 are illustrated in a simplified manner.

First, as illustrated in FIG. 6, a downhole plug 100 includes a mandrel 101, an elastic member 102, a retaining member 103 disposed adjacent to the elastic member 102 on one side of the elastic member 102, cones 104 and 105 disposed so as to sandwich the elastic member 102 and the retaining member 103, a pair of slips 106a and 106b, and a pair of ring members 107a and 107b.

In a wellbore (not illustrated), the downhole plug 100 is installed within a casing 20 disposed inside the wellbore as illustrated in FIG. 7A. When the wellbore is plugged by the downhole plug 100, the elastic member 102 is deformed as a gap between the cone 105 and the retaining member 103 is narrowed due to an axial movement of the mandrel 101. Then, the elastic member 102 extends radially outward in a circumferential direction of an axis of the mandrel 101. Then, the elastic member 102 abuts against the casing 20, to thus cause between the downhole plug 100 and the casing 20 to be plugged. Subsequently, the wellbore is plugged by setting a ball or the like at a hollow portion in an axial direction of the mandrel 101. A fluid is then pumped at high pressure into the plugged section from the cone 105 side, to perform hydraulic fracturing for forming fractures in a productive layer.

Unfortunately, in case when the deformation of the elastic member 102 is not controlled, the elastic member 102 enters between the mandrel 101 and the retaining member 103 as indicated by an arrow in FIG. 7B when the elastic member 102 is deformed by a pressure exerted on the cone 105. This allows the elastic member 102 having entered between the mandrel 101 and the retaining member 103 to constrict or extend the mandrel 101. As a result, deformation may occur in the mandrel 101, or a breakage may be caused to other components (not illustrated) constituting the downhole plug.

Note that the retaining member 103 described above is occasionally integrally formed with the cone 104. The downhole plug having such a configuration will be described below with reference to FIG. 8.

FIG. 8 is a view illustrating another aspect of a downhole plug in the related art, and schematically illustrating a portion of an axial cross-section of the downhole plug. Note that, for convenience of explanation, members having the same function as those illustrated in FIG. 6 are denoted by the same reference signs, and descriptions of these will not be given.

As illustrated in FIG. 8, in a downhole plug 200, a retaining member 203 is formed as an integrated component formed by integrating the retaining member 103 and the cone 104 illustrated in FIG. 6. Even with the downhole plug 200 thus configured, an issue similar to that in the downhole plug 100 described above (see FIG. 6) arises.

The present invention has been made in view of the above-described issues, and aims to provide a plug for well completion, which does not cause an adverse effect such as failure of a member constituting the plug when a wellbore is plugged.

Solution to Problem

In order to resolve the above-described issues, a plug according to an aspect of the present invention is a plug configured to plug a wellbore provided at a well during completion, the plug including:

a tubular member having a hollow shape;

an elastic member having an annular shape attached to an outer circumferential surface of the tubular member, the annular elastic member being deformable by exerted pressure; and a retaining member having an annular shape attached, adjacent to the elastic member, onto the outer circumferential surface of the tubular member, downstream of where a pressure is exerted on the elastic member, wherein the retaining member is configured to include an annular inner portion which comes in contact with the outer circumferential surface of the tubular member, and an annular outer portion having an inner diameter that is equivalent to or larger than the annular inner portion and being movably attached to the annular inner portion, the annular outer portion including a face facing the elastic member.

Another aspect of the present invention provides a retaining member used for a plug provided at a well during completion and having a function of plugging a wellbore. A retaining member according to an aspect of the present invention is a retaining member having an annular shape, used for a plug configured to plug a wellbore provided at a well during completion, the plug including:

a tubular member having a hollow structure; and an elastic member with an annular shape attached to an outer circumferential surface of the tubular member, the annular elastic member being deformable by exerted pressure, wherein the retaining member is attached, adjacent to the elastic member, onto the outer circumferential surface of the tubular member, downstream of where a pressure is exerted on the elastic member, the retaining member being configured to include an annular inner portion which comes into contact with the outer circumferential surface of the tubular member, and an annular outer portion having an inner diameter that is equivalent to or larger than the annular inner portion and being movably attached to the annular inner portion, the annular outer portion including a face that is to face the elastic member.

Still another aspect of the present invention provides a method for well completion. The method for well completion according to the still another aspect of the present invention uses a plug according to an aspect of the present invention.

Advantageous Effects of Invention

According to an aspect of the present invention, a plug can be provided which does not cause an adverse effect such as failure of a member constituting the plug when a wellbore is plugged.

BRIEF DESCRIPTION OF THE DRAWINGS

FIG. 3 is a view schematically illustrating how a robber is deformed in a downhole plug according to an embodiment of the present invention, where FIG. 3A illustrates a view before exerting a pressure, and FIG. 3B illustrates a view after a pressure is exerted.

FIG. 4 is a view schematically illustrating a portion of an axial cross-section of a downhole plug according to a first alternative aspect of the present invention.

FIG. 5 is a view schematically illustrating a portion of an axial cross-section of a downhole plug according to a second alternative aspect of the present invention.

FIG. 6 is a view schematically illustrating a portion of an axial cross-section of a downhole plug in the related art.

FIGS. 7A and 7B are view schematically illustrating a portion of a downhole plug illustrated in FIG. 6, where FIG. 7A illustrates a view before exerting a pressure, and FIG. 7B illustrates a view after a pressure is exerted.

FIG. 8 is a view of another aspect of a downhole plug in the related art, schematically illustrating a portion of an axial cross-section of the downhole plug.

DESCRIPTION OF EMBODIMENTS

Downhole Plug

First, an embodiment of a downhole plug (plug) and a socket (retaining member) according to an aspect of the present invention will be described below with reference to figures.

Figure 1:
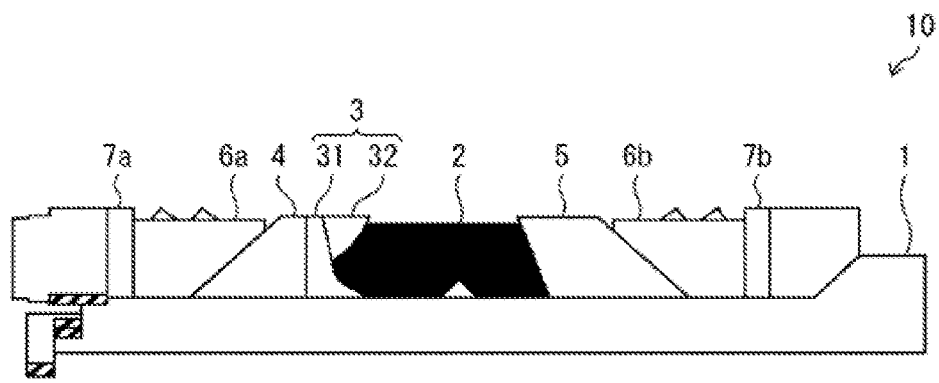
FIG. 1 is a view schematically illustrating a portion of an axial cross-section of a downhole plug according to an embodiment of the present invention.

FIG. 1 is a view schematically illustrating a portion of an axial cross-section of the downhole plug according to the embodiment. As illustrated in FIG. 1, a downhole plug 10 includes a mandrel 1 (tubular member), a sealing member (elastic member) 2, a socket (retaining member) 3, cones 4 and 5, a pair of slips 6a and 6b, and a pair of ring-shaped fixing members 7a and 7b.

Note that, for convenience of explanation, in FIG. 1, an axial direction of the downhole plug is illustrated as the horizontal direction of the plane of the paper. In an actual use, however, the downhole plug is occasionally disposed such that the axial direction of the downhole plug extends along the depth direction of a wellbore.

The downhole plug 10 is a tool for well completion used for plugging and fixing a wellbore (not illustrated).

The mandrel 1, which is a member for ensuring a strength of the downhole plug 10, has a hollow shape.

A sealing member 2, which is an annular rubber member, is attached onto an outer circumferential surface in an axial direction of the mandrel 1 between a socket 3 and a cone 5. The sealing member 2 is deformed when a pressure is exerted on the downhole plug 10. It is preferred that the sealing member 2 be formed from a material that does not lose a function of plugging a wellbore due to the sealing member 2 even in an environment under high temperature and high pressure, for example. Preferred materials for forming the sealing member 2 include nitrile rubber, hydrogenated nitrile rubber, acrylic rubber, and fluororubber. For the materials for forming the sealing member 2, a degradable rubber can also be used, such as aliphatic polyester-based rubber, polyurethane rubber, natural rubber, polyisoprene, acrylic rubber, aliphatic polyester rubber, polyester-based thermoplastic elastomer, or poly amide-based thermoplastic elastomer.

The socket 3 is an annular member attached, adjacent to the sealing member 2, onto the outer circumferential surface in the axial direction of the mandrel 1, downstream of a pressure exerted on the sealing member 2.

In the embodiment, the socket 3 includes a socket-inner portion 31 and a socket-outer portion 32 that are in an annular shape. The socket-outer portion 32 is movably attached to the socket-inner portion 31. Note that details of the socket 3 will be described later.

The cones 4 and 5 are formed such that when a pressure is exerted on the pair of slips 6a and 6b toward the sealing member 2, the slips 6a and 6b are slidably moved on inclined surfaces of the cones 4 and 5, respectively.

The fixing members 7a and 7b are annular members that fix positions of the slips 6a and 6b with respect to the axial direction of the mandrel 1. The fixing members 7a and 7b are arranged adjacent to the slips 6a and 6b on the outer circumferential surface of the mandrel 1.

In the embodiment, examples of the material that forms the mandrel 1, the socket 3, the cones 4 and 5, the pair of slips 6a and 6b, and the pair of fixing members 7a and 7b include, for example, metal materials such as aluminum, steel, and stainless steel; fibers; woods; composite materials; resins; and the like. The mandrel 1 can be composed of a composite material containing a reinforcing material such as carbon fiber, specifically, for example, a composite material containing a polymerized material such as epoxy resin and phenol resin, and the like. It is preferred that the mandrel 1, the socket 3, the cones 4 and 5, the pair of slips 6a and 6b, and the pair of fixing members 7a and 7b be each composed of a degradable resin or a degradable metal. This facilitates removal of the downhole plug 10 after a wellbore processing is performed using the downhole plug 10.

Note that in this specification, the term "degradable resin or degradable metal" refers to resin or metal that can be biodegraded or hydrolyzed, dissolved in water or hydrocarbons within a well, and that can further be decomposed and embrittled to be easily disintegrated by some chemical method. Examples of the degradable resin include hydroxycarboxylic acid-based aliphatic polyesters such as polylactic acid (PLA) and polyglycolic acid (PGA); lactone-based aliphatic polyesters such as poly-ε-caprolactone (PCL); diol-dicarboxylic acid-based aliphatic polyesters such as polyethylene succinate and polybutylene succinate; copolymers of these, including, for example, poly(lactic-co-glycolic acid); as well as mixtures of these; and the like. Another example is an aliphatic polyester used by combining polyethylene adipate/terephthalate or similar aromatic components.

Further, examples of the water-soluble resin include polyvinyl alcohol; polyvinyl butyral; polyvinyl formal; polyacrylamide (optionally N,N-substituted); polyacrylic acid; and polymethacrylic acid. Another example is copolymers of monomers that form these resins, for example, ethylene-vinyl alcohol copolymers (EVOH), acrylamide-acrylic acid-methacrylic acid interpolymers, and the like.

Examples of the degradable metal include alloys containing magnesium, aluminum, calcium, and the like as main components, for example.

Next, a configuration of the socket 3 illustrated in FIG. 1 is described in detail with reference to FIGS. 2 and 3 in addition to FIG. 1.

Figure 2:
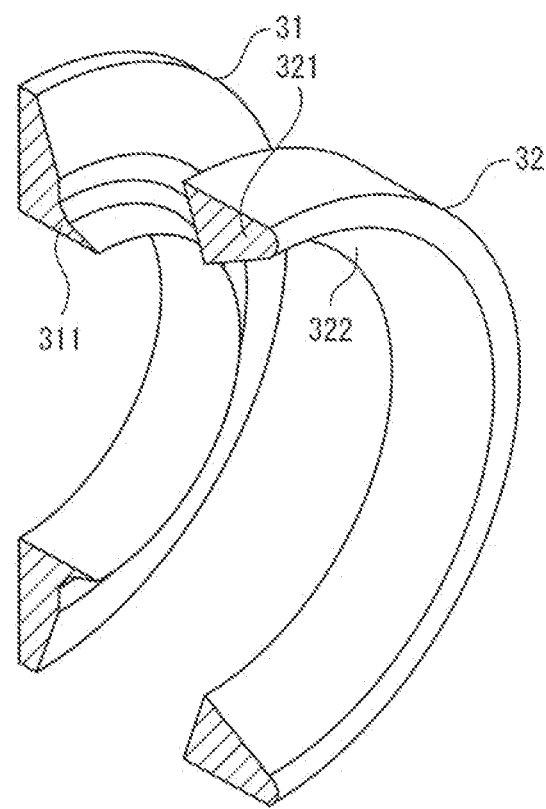
FIG. 2 is cross-sectional perspective views of a socket-inner portion and a socket-outer portion according to an embodiment of the present invention.

FIG. 2 is cross-sectional perspective views of the socket-inner portion 31 and the socket-outer portion 32 illustrated in FIG. 1. FIG. 3 is a view schematically illustrating how the sealing member 2 is deformed in the downhole plug 10 illustrated in FIG. 1. For convenience of explanation, in FIGS. 2 and 3, an axial direction of the downhole plug is illustrated as the horizontal direction of the plane of the paper. In an actual use, however, the downhole plug is occasionally disposed such that the axial direction of the downhole plug extends along the depth direction of a wellbore.

Referring to FIGS. 2 and 3, the socket-outer portion 32 is movably attached to the socket-inner portion 31 as described above. More specifically, in the axial direction and on a side of the sealing member 2 of the socket-inner portion 31, the socket-outer portion 32 is movably attached to the socket-inner portion 31. In the embodiment, the socket-outer portion 32 is disposed between the socket-inner portion 31 and the sealing member 2, to thus provide a configuration in which the socket-outer portion 32 is attached to the socket-inner portion 31. This allows the socket-outer portion 32 to include a face 322 facing the sealing member 2.

The socket-outer portion 32 has a larger inner diameter than the socket-inner portion 31. Accordingly, in the socket 3, only the socket-inner portion 31 is in contact with the mandrel 1, and the socket-outer portion 32 is not in contact with the mandrel 1. On the other hand, an outer diameter of the socket-inner portion 31 is the same as an outer diameter of the socket-outer portion 32.

Thus, in a state illustrated in FIG. 3A, when the sealing member 2 receives a pressure from the cone 5 to be deformed, the socket 3 attached downstream of the pressure receives the deformation of the sealing member 2. Then, when the sealing member 2 is pressed against the face 322 of the socket-outer portion 32 that faces the sealing member 2 to exert a force, the socket-outer portion 32 is deformed to extend a diameter of the socket-outer portion 32, to cause the socket-outer portion 32 to be slidably moved on the socket-inner portion 31 to change a form of the socket 3. This allows the force exerted on the socket 3 from the sealing member 2 to disperse, making it possible to prevent breakage to members such as the socket 3, which constitute the downhole plug.

In view of the above, it is preferred that the socket-outer portion 32 contain a material that can change to extend in diameter when a pressure is exerted on the socket-outer portion 32 from the sealing member 2. In the embodiment, the socket-outer portion 32 is composed of PGA.

In the downhole plug 10 of the embodiment, an inner circumferential edge 311 of the socket-inner portion 31 that comes in contact with the mandrel 1 protrudes toward the sealing member 2. More specifically, a tip end of the protruding portion protrudes toward the sealing member 2 in a manner to come into contact with the mandrel 1. That is, the downhole plug 10 has a configuration in which the entire of the inner circumferential surface of the socket-inner portion 31, including the protruding portion, comes in contact with the mandrel 1. This effectively prevents a portion of the sealing member 2 having been deformed by a pressure exerted in a direction toward the socket 3 from entering between the socket-inner portion 31 and the mandrel 1. Accordingly, an occurrence of deformation or breakage of the mandrel 1, and further of other components constituting the downhole plug 10 can be prevented, due to the sealing member 2 entering between the socket 3 and the mandrel 1.

Moreover, in the downhole plug 10 of the embodiment, a side of the sealing member 2 that comes in contact with the socket 3 enters into a concave portion between the inner circumferential edge 311 and an outer circumferential edge 321 formed by the protrusions of the inner circumferential edge 311 of the socket-inner portion 31 and the outer circumferential edge 321 of the socket-outer portion 32. This allows, when the sealing member 2 is deformed by exerted load inside the wellbore (not illustrated), the sealing member 2 to be pressed against the socket 3 with less load. Accordingly, the wellbore can be plugged with less load.

Note that, in the downhole plug 10 according to the above-described embodiment, the outer diameter of the socket-inner portion 31 is, but not limited to, the same as the outer diameter of the socket-outer portion 32. For example, the downhole plug 10 may include the socket-outer portion 32 having an outer diameter that is greater than that of the socket-inner portion 31. In this case, an outer circumferential surface of the socket 3 is formed only by the socket-outer portion 32. Further, the socket-outer portion 32 may have an outer diameter that is less than the outer diameter of the socket-inner portion 31. In this case, the outer circumferential surface of the socket 3 is formed only by the socket-inner portion 31.

As still another aspect, at least one of the socket-inner portion 31 and the socket-outer portion 32 may be a component that is constituted by two or more components. That is, the socket 3 may be a component that is constituted by three or more components.

As still another aspect, the socket 3 may be provided to come in contact with the sealing member 2 even upstream of where the pressure is exerted. That is, a configuration may be employed in which the socket 3 is also provided between the cone 5 and the sealing member 2, and the sealing member 2 is disposed between the two sockets.

In the embodiment, a configuration of the downhole plug is, but not limited to, the configuration of the downhole plug 10 described above. Accordingly, in the downhole plug according to the present embodiment, a non-illustrated socket-outer may have an inner diameter commensurate with that of the socket-inner, and may be movably attached to the socket-inner.

The downhole plug according to the present embodiment may further be implemented as a first or second alternative aspect that will be described below.

First Alternative Aspect

In a first alternative aspect of the downhole plug according to the embodiment, the socket-inner 31 and the cone 4 in the downhole plug 10 illustrated in FIG. 1 may be integrated with each other. A downhole plug having such a configuration will be described below with reference to FIG. 4.

FIG. 4 is a view schematically illustrating a portion of an axial cross-section of a downhole plug according to the first alternative aspect. For convenience of explanation, in FIG. 4, an axial direction of the downhole plug is illustrated as the horizontal direction of the plane of the paper. In an actual use, however, the downhole plug is occasionally disposed such that the axial direction of the downhole plug extends along the depth direction of a wellbore. Note that, for convenience of explanation, members having the same function as those illustrated in FIG. 1 are denoted by the same reference signs, and descriptions of these will not be given.

As illustrated in FIG. 4, in a downhole plug 53, a socket-inner 33 is formed as an integrated component that the socket-inner 31 and the cone 4 illustrated in FIG. 1 are integrated with each other, as described above. That is, a configuration is employed in which the cone also serves as a socket, specifically, a socket-inner. Thus, a structure on the side of the sealing member 2 of the inner circumferential edge of the cone includes the structure on the side of the sealing member 2 of the inner circumferential edge of the above-described socket. As the downhole plug 53 thus configured, the same advantage is obtained as in the downhole plug 1 (see FIG. 1).

Second Alternative Aspect

In a second alternative aspect of the downhole plug according to the present embodiment, the inner diameter of the socket-outer may be the same as the inner diameter of the socket-inner. A downhole plug having such a configuration will be described below with reference to FIG. 5.

FIG. 5 is a view schematically illustrating a portion of an axial cross-section of a downhole plug according to the second alternative aspect. For convenience of explanation, in FIG. 5, an axial direction of the downhole plug is illustrated as the horizontal direction of the plane of the paper. In an actual use, however, the downhole plug is occasionally disposed such that the axial direction of the downhole plug extends along the depth direction of a wellbore. Note that, for convenience of explanation, members having the same function as those illustrated in FIG. 1 are denoted by the same reference signs, and descriptions of these will not be given.

As illustrated in FIG. 5, in a downhole plug 63, the inner diameter of a socket-outer 34 is the same as the inner diameter of a socket-inner 35. The socket-outer 34 has the outer diameter larger than the socket-inner 35, and the socket-inner 35 is disposed at a position at which the socket-inner 35 is disposed between the socket-outer 34 and the sealing member 2. As the downhole plug 63 thus configured, the same advantage is obtained as in the downhole plug 1.

Note that, in the downhole plug of the second alternative aspect, the socket-outer may be integrally formed with a cone. That is, a configuration may be employed in which the cone also serves as a socket, specifically, a socket-outer.

Method for Well Completion

The method for well completion according to an embodiment of the present invention performs well completion using the downhole plug 10 described above. The above method can be similar to the method of well completion in the related art using a downhole plug except for using the downhole plug 10 as a downhole plug.

According to Embodiment, when a wellbore is plugged by the sealing member 2, a deformation of the sealing member 2 does not cause an adverse effect such as a breakage on members constituting the downhole plug. Thus, a well completion can be performed in an efficient manner.

SUMMARY

A plug according to an aspect of the present invention is a plug configured to plug a wellbore provided at a well during completion, the plug including:

a tubular member having a hollow shape;

an elastic member having an annular shape attached to an outer circumferential surface of the tubular member, the annular elastic member being deformable by exerted pressure; and a retaining member having an annular shape attached, adjacent to the elastic member, onto the outer circumferential surface of the tubular member, downstream of where a pressure is exerted on the elastic member, wherein the retaining member is configured to include an annular inner portion which comes in contact with the outer circumferential surface of the tubular member, and an annular outer portion having an inner diameter that is equivalent to or larger than the annular inner portion and being movably attached to the annular inner portion, the annular outer portion including a face facing the elastic member.

According to the above-described configuration, an elastic member and a retaining member adjacent to the elastic member are provided at the outer circumferential surface of the tubular member having a hollow structure. The retaining member is located downstream of where the pressure is exerted on the elastic member. Thus, when the elastic member is deformed by a pressure exerted inside the wellbore, the retaining member attached downstream of the pressure is to receive the deformation. Here, the retaining member is configured to include an annular inner portion and an annular outer portion, where the annular outer portion is movably attached to the annular inner portion. As a result, the elastic member presses against a face of the annular outer portion facing the elastic member to exert a force, the annular outer portion moves to change a form of the retaining member. This allows a force exerted on the retaining member from the elastic member to disperse, making it possible to prevent breakage to the retaining member.

Further, in the plug according to an aspect of the present invention, it is preferred that an inner circumferential edge of the plug that comes in contact with the tubular member in the annular inner portion protrude toward the elastic member.

The above-described configuration can prevent a portion of the elastic member having been deformed by a pressure exerted in a direction toward the retaining member from entering between the inner portion of the retaining member and the tubular member. This prevents deformation or breakage of the tubular member from occurring, due to the elastic member entering between the retaining member and the tubular member.

Further, in the plug according to an aspect of the present invention, it is preferred that the outer circumferential edge of the annular outer portion of the retaining member protrude toward the elastic member, and a side of the elastic member that is in contact with the retaining member enter into a concave portion between the inner circumferential edge and the outer circumferential edge formed by the protrusions of the inner circumferential edge and the outer circumferential edge of the retaining member.

According to the above-described configuration, when the elastic member is deformed as a gap between the cone and the retaining member is narrowed inside the wellbore, the elastic member can be pressed against the retaining member with less load. Accordingly, the wellbore can be plugged with less load.

Further, it is preferred that in the plug according to an aspect of the present invention, the retaining member be composed of a degradable resin or a degradable metal.

According to the above-described configuration, the retaining member can be degraded after the plug is used, making it possible to dispense with the time and effort necessary for collecting the retaining member after the plug is used.

Another aspect of the present invention provides a retaining member used for a plug provided at a well during completion and having a function of plugging a wellbore. A retaining member according to an aspect of the present invention is a retaining member having an annular shape, used for a plug configured to plug a wellbore provided at a well during completion, the plug including:
a tubular member having a hollow structure; and
an elastic member with an annular shape attached to an outer circumferential surface of the tubular member, the annular elastic member being deformable by exerted pressure, wherein the retaining member is attached, adjacent to the elastic member, onto the outer circumferential surface of the tubular member, downstream of where a pressure is exerted on the elastic member, the retaining member being configured to include
an annular inner portion which comes into contact with the outer circumferential surface of the tubular member, and an annular outer portion having an inner diameter that is equivalent to or larger than the annular inner portion and being movably attached to the annular inner portion, the annular outer portion including a face that is to face the elastic member.

Still another aspect of the present invention provides a method for well completion. The method for well completion according to the still another aspect of the present invention uses a plug according to an aspect of the present invention.

The present invention is not limited to the embodiments described above, and may be variously altered within the scope set forth in the claims. That is, embodiments obtained by combining appropriately altered technical means within the scope set forth in the claims are encompassed within the technical scope of the present invention.

EXAMPLES

In order to investigate a technical advantage of the downhole plug according to another aspect of the present invention, the following experiments were conducted.

Example 1

Formation of Downhole Plug (A)

A downhole plug (A) having a configuration described in the above-described embodiment was prepared as a downhole plug of Example 1. Note that the mandrel, socket, and cones were formed from PGA, the pair of slips, and the pair of fixing members were formed from magnesium alloy, and the sealing member was formed from polyurethane rubber.

Evaluation of Water-Pressure Test Results

The downhole plug (A) was fixed in a casing by performing an actuation. Next, water was sealed within the casing while heating the inside of the casing to a temperature of 93° C., then water pressure of 10000 psi (approximately 70 MPa) was exerted on the downhole plug (A) with a pump to examine whether the downhole plug (A) can retain the water pressure for not less than 30 minutes. Then, if the downhole plug (A) could retain the water pressure for not less than 30 minutes, an evaluation of "Pass" is given as acceptable, while if the downhole plug (A) could not retain the water pressure for not less than 30 minutes, an evaluation of "Fail" is given as not acceptable. The results are listed in Table 1.

Evaluation of Anti-Extrusion Effect on Sealing Member

After the water-pressure test was conducted, a sealing member in the downhole plug (A) was visually confirmed. Then, if no extrusion on the sealing member due to a breakage of the socket or no entry of the sealing member between the socket and the mandrel was observed, an evaluation of "Pass" is given as an anti-extrusion effect on sealing member was present, while if extrusion or entry of the sealing member was observed, an evaluation of "Fail" is given as the anti-extrusion effect on the sealing member was not present. The results are listed in Table 1.

Reference Example 1

Formation of Downhole Plug (B)

A downhole plug (B) was prepared as a downhole plug of Reference Example 1, where the downhole plug (B) has a configuration as in the downhole plug (A) except for using a socket composed of a single member, even though the inner circumferential edge and the outer circumferential edge of the socket protrude toward the sealing member. The water-pressure test results and the anti-extrusion effect on the sealing member were then evaluated by the same procedure as in Example 1. The results are listed in Table 1.

Comparative Example 1

A downhole plug (C) was prepared as a downhole plug of Comparative Example 1, where the downhole plug (C) has a configuration as in the downhole plug (A) except for using a socket in which the inner circumferential edge of the socket does not protrude toward the sealing member as illustrated in FIG. 4. The water-pressure test results and the anti-extrusion effect on the sealing member were then evaluated by the same procedure as in Example 1. The results are listed in Table 1.

TABLE 1

|  | Actuation Load (kN) | Water-pressure test | Suppression of Sealing member |
|---|---|---|---|
| Example 1 | 66 | Pass | Pass |
| Reference Example 1 | 162 | Pass | ×(Extrusion due to breakage of socket Observed) |
| Comparative Example 1 | 98 | Fail | ×(Entry between socket and mandrel Observed) |

The downhole plugs of Example 1 and Reference Example 1 could retain a sealed state under water pressure of 10000 psi for not less than 30 minutes. The downhole plug was disassembled to confirm that the extrusion of the sealing member to the inside of the socket had been suppressed, and it was confirmed that breakage of the mandrel had been suppressed. However, in Reference Example 1, a breakage of the socket was confirmed, and a extrusion of the sealing member due to this was observed.

On the other hand, in the downhole plug of Comparative Example 1, the seal sate could not be retained under water pressure of 10000 psi for not less than 30 minutes. The downhole plug was disassembled to confirm that the sealing member had extruded to the inside of the socket, to thus constrict the mandrel to cause breakage of the mandrel.

INDUSTRIAL APPLICABILITY

The present invention can be used as a plug having a function of plugging a wellbore provided at a well during completion.

---

Reference Signs List

1 Mandrel (Tubular member)
2 Sealing member (Elastic member)
3 Socket (Retaining member)
4, 5 Cone
6a, 6b Slip
7a, 7b Ring-shaped fixing member
10 Downhole plug (Plug)
31 Socket-inner portion
32 Socket-outer portion
322 Face

---

The invention claimed is:

1. A plug configured to plug a wellbore, the plug comprising:
   a tubular member having a hollow structure;
   a slip;
   an elastic member having an annular shape and being attached to an outer circumferential surface of the tubular member, the annular elastic member being deformable by an exerted pressure; and
   a retaining member having an annular shape and being adjacent to the elastic member, wherein
   the retaining member includes:
      an annular inner portion which is in contact with the outer circumferential surface of the tubular member and is configured to be spaced from the slip; and
      an annular outer portion having an inner diameter that is equivalent to or larger than that of the annular inner portion and being adjacent to the annular inner portion,
   the annular outer portion includes a face facing the elastic member,
   the annular outer portion is not in contact with the tubular member before and after deformation of the annular elastic member,
   the annular inner portion includes a face that is in contact with the annular outer portion and that is inclined so as to be increasingly distant from the annular elastic member with increasing proximity to an outer periphery of the plug, and
   one of an edge of an inner circumferential surface of the annular inner portion that comes in contact with the tubular member extends toward the elastic member, and
   wherein the annular inner portion has first surface in contact with the annular outer portion and the elastic member, and
   wherein the first surface of the annular inner portion has a varying slope with respect to the tubular member, including:
      a first slope at a first side adjacent to the tubular member; and
      a second slope extending from the first slope, the second slope being greater than the first slope.

2. The plug according to claim 1, wherein
an outer circumferential edge of the annular outer portion of the retaining member extends toward the elastic member such that when the elastic member is deformed under pressure, the outer circumferential edge of the annular outer portion comes into contact with the elastic member.

3. The plug according to any one of claim 1, wherein the retaining member is composed of a degradable resin or a degradable metal.

4. The plug according to claim 1, wherein the inner circumferential edge includes a tip end in contact with the tubular member.

5. The plug according to claim 1, wherein the annular outer portion is configured to be in contact with the elastic member before and after deformation of the elastic member.

6. The plug according to claim 1, wherein the annular outer portion and the elastic member are configured to be spaced from a casing before deformation of the elastic member, and
   wherein the annular outer portion and the elastic member are configured to contact the casing after deformation of the elastic member.

7. A method for well completion, the method comprising using the plug according to claim 1, including:
   applying pressure to the plug to cause the elastic member to deform against the retaining member.

8. A retaining member having an annular shape, used for a plug configured to plug a wellbore, wherein
   the retaining member is configured to be used in the plug in such a manner as to be adjacent to an elastic member having an annular shape and being attached to an outer circumferential surface of a tubular member having a hollow structure, the annular elastic member being deformable by an exerted pressure, the retaining member includes:
- an annular inner portion configured to be in contact with the outer circumferential surface of the tubular member and is configured to be spaced from a slip; and
- an annular outer portion configured not to be in contact with the tubular member before and after deformation of the elastic member, the annular outer portion having an inner diameter that is equivalent to or larger than that of the annular inner portion and being adjacent to the annular inner portion, the annular outer portion includes a face configured to face the elastic member, the annular inner portion includes a face that is in contact with the annular outer portion and that is inclined so as to be increasingly distant from the annular elastic member with increasing proximity to an outer periphery of the plug, and one of edges of an inner circumferential surface of the annular inner portion that comes in contact with the tubular member extends toward the elastic member, and wherein the annular inner portion has first surface in contact with the annular outer portion and the elastic member, and wherein the first surface of the annular inner portion has a varying slope with respect to the tubular member, including:
- a first slope at a first side adjacent to the tubular member; and
- a second slope extending from the first slope, the second slope being greater than the first slope.

9. The retaining member according to claim 8, wherein the annular outer portion is configured to be in contact with the elastic member before and after deformation of the elastic member.

10. The retaining member according to claim 8, wherein the annular outer portion and the elastic member are configured to be spaced from a casing before deformation of the elastic member, and wherein the annular outer portion and the elastic member are configured to contact the casing after deformation of the elastic member.

\* \* \* \* \*